US008890847B2

(12) United States Patent
Chen et al.

(10) Patent No.: US 8,890,847 B2
(45) Date of Patent: Nov. 18, 2014

(54) OPTICAL TOUCH SYSTEM AND TOUCH POINT CALCULATION METHOD THEREOF

(75) Inventors: Shih-Wen Chen, New Taipei (TW); Shang-Chin Su, New Taipei (TW)

(73) Assignee: Wistron Coporation, New Taipei (TW)

( * ) Notice: Subject to any disclaimer, the term of this patent is extended or adjusted under 35 U.S.C. 154(b) by 119 days.

(21) Appl. No.: 13/610,896

(22) Filed: Sep. 12, 2012

(65) Prior Publication Data

US 2014/0015799 A1    Jan. 16, 2014

(30) Foreign Application Priority Data

Jul. 11, 2012   (TW) .............................. 101124965 A

(51) Int. Cl.
  *G06F 3/042*   (2006.01)
(52) U.S. Cl.
  USPC ......................................................... 345/175
(58) Field of Classification Search
  CPC ..................................................... G06F 3/0421
  USPC ......................................................... 345/175
  See application file for complete search history.

(56) References Cited

U.S. PATENT DOCUMENTS

| 2006/0232792 | A1* | 10/2006 | Kobayashi | .................... 356/621 |
| 2010/0321340 | A1  | 12/2010 | Hsiao et al. | |
| 2011/0193823 | A1* | 8/2011  | Su et al. | ......................... 345/175 |
| 2011/0266074 | A1* | 11/2011 | Fan et al. | .................... 178/18.09 |
| 2012/0032924 | A1* | 2/2012  | Ha et al. | ......................... 345/175 |

OTHER PUBLICATIONS

"Office Action of Taiwan Counterpart Application", issued on Aug. 20, 2014, pp. 1-6 with partial English translation.

* cited by examiner

*Primary Examiner* — Long D Pham
(74) *Attorney, Agent, or Firm* — Jianq Chyun IP Office

(57) ABSTRACT

An optical touch system and a touch point calculation method thereof are provided. The optical touch system includes a first lens, a second lens and a screen. The first and second lenses are disposed on the same side of the screen and face to the other side of the screen. In the method, images of a touch object above the screen are captured and used to calculate a first and a second touch signal of the touch object touching the screen before and after a preset time. Then, it is determined whether a width difference of the first and second touch signals exceeds a predetermined threshold. If yes, a third touch signal corresponding to the first touch signal relative to the second touch signal is calculated. Finally, positions of the first touch signal and the third touch signal are taken as locations of two touch points on the screen.

17 Claims, 5 Drawing Sheets

OPTICAL TOUCH SYSTEM AND TOUCH POINT CALCULATION METHOD THEREOF

CROSS-REFERENCE TO RELATED APPLICATION

This application claims the priority benefit of Taiwan application serial no. 101124965, filed on Jul. 11, 2012. The entirety of the above-mentioned patent application is hereby incorporated by reference herein and made a part of this specification.

BACKGROUND

1. Technical Field

The invention relates to a touch system and a touch method. Particularly, the invention relates to an optical touch system supporting multi-touch and a touch point calculation method thereof.

2. Related Art

Along with widespread use of windows operating system Windows 7, all-in-one (AIO) personal computers (PCs) with a highlighted multi-touch function gradually become a mainstream in the market. In the conventional resistive, capacitive and back projection touch screens, the capacitive touch screen has a best touch effect, though the cost thereof is most expensive and increases along with a size of the touch screen, so that usage effectiveness of the capacitive touch screen is inadequate.

In order to seek an alternatives, an optical touch screen that uses optical lenses to detect a touch position is developed, which has advantages of low cost and good accuracy, etc., and is competitive in the market, so that it becomes another choice of the large size touch screen.

In the optical touch screen, a plurality of optical lenses are configured at an edge of the screen to capture images of user's finger operated on the screen, and a position of finger shadow in the captured image generated due to that the finger interrupts the light is analysed to obtain relative angles between a finger touch point and the optical lenses, and then according to a known distance between the optical lenses, an actuate position of the touch point can be calculated through triangulation.

The aforementioned method for determining a finger position according to the finger shadow has already achieved high accuracy in application of detecting single-finger touch. However, in application of detecting multi-finger touch, since a distance between the fingers is rather close, in certain angles, positions of different fingers appeared in the images captured by the optical lenses are overlapped, which leads to a result that the optical touch screen misjudges the multi-finger operation as a single-finger operation.

For example, FIG. 1 is a schematic diagram of a conventional optical touch screen detecting a finger touch. Referring to FIG. 1, in the conventional optical touch screen, optical lenses 12 and 13 are respectively configured at corners (for example, an upper left corner and an upper right corner) of a same side of a screen 11, and the optical lenses 12 and 13 all face to the other side of the screen 11, so as to capture finger gestures of the user operated on the screen 11. When the user uses two fingers 14 and 15 to touch the screen 11, since a distance between the two fingers 14 and 15 is close, the fingers 14 and 15 are overlapped in the field of vision of the optical lenses 12 and 13, and as a result, the optical touch screen may misjudge the above operation as a single-finger operation of a finger 16 shown as dot lines, so that a recognition rate of multi-touch of the optical touch screen is decreased.

SUMMARY

Accordingly, the invention is directed to an optical touch system and a touch point calculation method thereof, which improves a recognition rate of multi-touch.

The invention provides a touch point calculation method, which is adapted to an optical touch system having a first lens, a second lens and a screen, where the first lens and the second lens are disposed on a same side of the screen and face to the other side of the screen. In the method, images of at least one touch object above the screen that are captured by the first lens and the second lens are analysed to respectively calculate a first touch signal and a second touch signal of the at least one touch object touching the screen before and after a predetermined time. Then, it is determined whether a width difference of the second touch signal and the first touch signal exceeds a predetermined threshold. When the width difference exceeds the predetermined threshold, a third touch signal corresponding to the first touch signal relative to the second touch signal is calculated. Finally, positions of the first touch signal and the third touch signal are taken as positions of two touch points on the screen.

In an embodiment of the invention, in the step of determining whether the width difference of the second touch signal and the first touch signal exceeds the predetermined threshold, when the width difference does not exceed the predetermined threshold, positions of the first touch signal and the second touch signal are taken as positions of one touch point on the screen before and after the predetermined time.

In an embodiment of the invention, the step of analysing the images of the at least one touch object above the screen that are captured by the first lens and the second lens to respectively calculate the first touch signal and the second touch signal of the at least one touch object touching the screen before and after the predetermined time includes following steps. A first image and a second image above the screen that are respectively captured by the first lens and the second lens are obtained, and positions and widths of the at least one touch object appeared in the first image and the second image are detected, so as to calculate the first touch signal of the at least one touch object touching the screen. After the predetermined time, a third image and a fourth image above the screen that are respectively captured by the first lens and the second lens are obtained, and positions and widths of the at least one touch object appeared in the third image and the fourth image are detected, so as to calculate the second touch signal of the at least one touch object touching the screen.

In an embodiment of the invention, before the step of determining whether the width difference of the second touch signal and the first touch signal exceeds the predetermined threshold, a threshold corresponding table is further established, which records predetermined thresholds corresponding to a plurality positions on an axial direction of the screen.

In an embodiment of the invention, the step of determining whether the width difference of the second touch signal and the first touch signal exceeds the predetermined threshold includes looking up the threshold corresponding table according to a position of the second touch signal on the axial direction to obtain the corresponding predetermined threshold to serve as a basis for comparing with the width difference.

In an embodiment of the invention, in the threshold corresponding table, the more the position approaches to two endpoints on the axial direction of the screen, the higher the corresponding predetermined threshold is.

In an embodiment of the invention, the step of calculating the third touch signal corresponding to the first touch signal relative to the second touch signal includes taking a center point of the second touch signal as a center and calculating a mirror position of the position of the first touch signal relative to the center point to serve as the position of the third touch signal.

In an embodiment of the invention, the step of calculating the position of the first touch signal includes calculating angles of a center point of the first touch signal relative to the first lens and the second lens; and obtaining the position of the first touch signal through triangulation location according to the angles and a distance between the first lens and the second lens.

The invention provides an optical touch system including a screen, a first lens, a second lens and a control unit. The first lens and the second lens are disposed on a same side of the screen and face to the other side of the screen for capturing images of at least one touch object above the screen. The control unit is coupled to the first lens and the second lens, and includes an image analysis module, a determination module and a position calculation module. The image analysis module analyses the images captured by the first lens and the second lens, and respectively calculates a first touch signal and a second touch signal of the at least one touch object touching the screen before and after a predetermined time. The determination module determines whether a width difference of the second touch signal and the first touch signal exceeds a predetermined threshold. When the determination module determines that the width difference exceeds the predetermined threshold, the position calculation module calculates a third touch signal corresponding to the first touch signal relative to the second touch signal, and takes positions of the first touch signal and the third touch signal as positions of two touch points on the screen.

In an embodiment of the invention, when the determination module determines that the width difference does not exceed the predetermined threshold, the position calculation module takes positions of the first touch signal and the second touch signal as positions of one touch point on the screen before and after the predetermined time.

In an embodiment of the invention, the image analysis module detects positions and widths of the at least one touch object appeared in a first image and a second image captured by the first lens and the second lens, so as to calculate the first touch signal of the at least one touch object touching the screen.

In an embodiment of the invention, the image analysis module further detects and positions and widths of the at least one touch object appeared in a third image and a fourth image captured by the first lens and the second lens after the predetermined time, so as to calculate the second touch signal of the at least one touch object touching the screen.

In an embodiment of the invention, the optical touch system further includes a threshold storage module. The threshold storage module stores a threshold corresponding table, which records predetermined thresholds corresponding to a plurality positions on an axial direction of the screen.

In an embodiment of the invention, the determination module looks up the threshold corresponding table according to a position of the second touch signal on the axial direction to obtain the corresponding predetermined threshold to serve as a basis for comparing with the width difference.

In an embodiment of the invention, in the threshold corresponding table, the more the position approaches to two endpoints on the axial direction of the screen, the higher the corresponding predetermined threshold is.

In an embodiment of the invention, the position calculation module takes a center point of the second touch signal as a center and calculates a mirror position of the position of the first touch signal relative to the center point to serve as the position of the third touch signal.

In an embodiment of the invention, the position calculation module calculates angles of a center point of the first touch signal relative to the first lens and the second lens, and obtains the position of the first touch signal through triangulation location according to the angles and a distance between the first lens and the second lens.

According to the above descriptions, in the optical touch system and the touch point calculation method thereof of the present invention, the images captured by two lenses of the optical touch system are used to respectively calculate the touch signals of the touch object touching the screen before and after the predetermined time, so as to deduce positions of two touch points of the touch object touching the screen. In this way, a recognition rate of multi-touch is improved.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

By observing general actions that a user uses two fingers to operate a touch screen, it is discovered that due to different lengths of the two fingers or other factors, the actions that the two fingers touch the screen have a certain time difference. Therefore, in the invention, based on a high frame rate of optical lenses, images of the user operated above the screen are continuously captured within a very short time, so as to recognize touch objects that touch the screen in tandem, and accordingly calculate positions of touch points. In the invention, the image of the touch object that is first captured by the lens is regarded as an image of a first touch object (for example, a first finger), and the image captured after a predetermined time is regarded as an image containing a plurality of touch objects (for example, the first finger and a second finger). Moreover, according to variation of widths of the touch signals of the touch objects, it can be determined whether the image captured by the lens is an image with overlapped touch objects or an image that a single touch object moves towards the lens. In this way, a recognition rate of multi-touch is improved.

Figure 1:
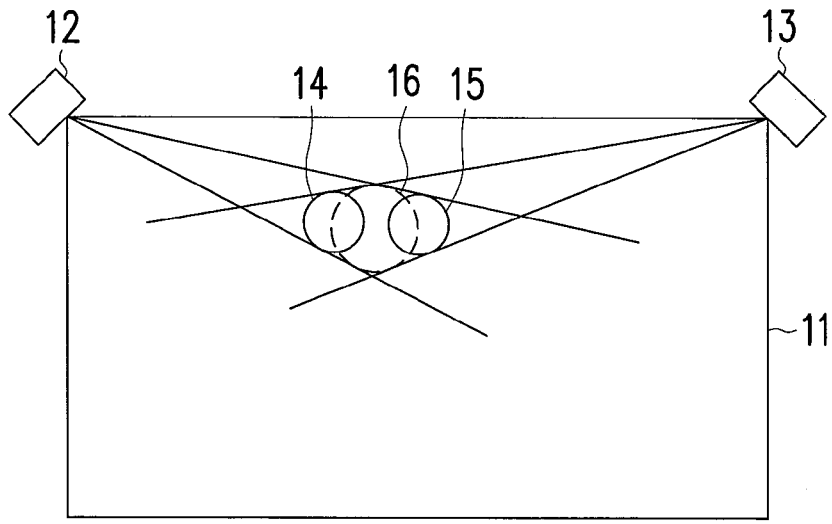
FIG. 1 is a schematic diagram of a conventional optical touch screen detecting a finger touch.
Figure 2:
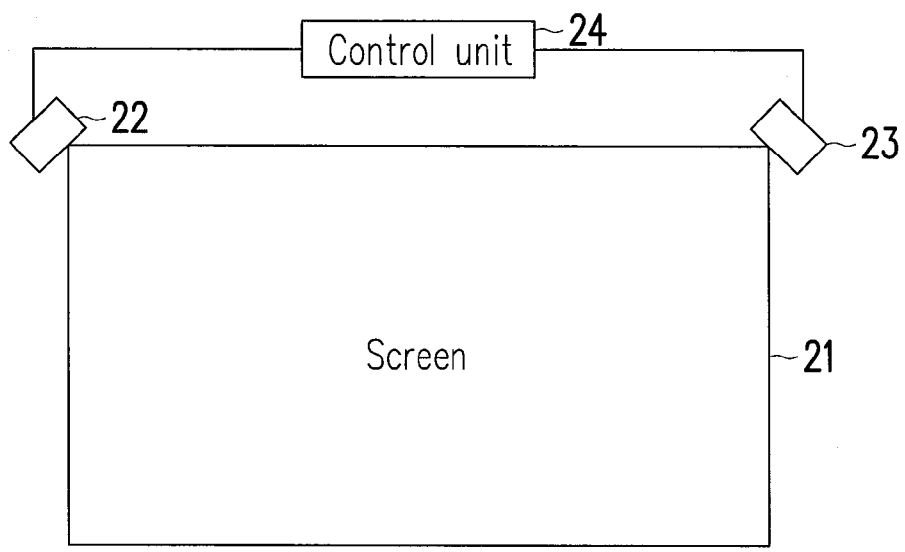
FIG. 2 is a block diagram of an optical touch system according to an embodiment of the invention.

FIG. 2 is a block diagram of an optical touch system according to an embodiment of the invention. Referring to FIG. 2, the optical touch system 20 of the present embodiment is, for example, an optical touch monitor (OTM), which includes a screen 21, a first lens 22, a second lens 23 and a control unit 24. Functions of the above components are described below:

The screen 21 is, for example, a liquid crystal display (LCD), a light-emitting diode (LED) display, a field emission display (FED) or other types of displays, which can display an operation frame to facilitate the user to operate though fingers.

The first lens 22 and the second lens 23 are, for example, optical lenses that use photo sensors such as a charge coupled device (CCD), a complementary metal oxide semiconductor (CMOS) to capture images, and are configured at a same side of the screen 21 (for example, a left corner and a right corner of an upper side) and face to the other side of the screen 21 (for example, two opposite corners of a lower side), so as to capture images of at least one touch object operated above the screen 21.

The control unit 24 is, for example, a central processing unit (CPU), a microprocessor, a digital signal processor (DSP), application specific integrated circuits (ASIC) or other similar devices. The control unit 24 is respectively coupled to the first lens 22 and the second lens 23, and receives and analyses images captured by the first lens 22 and the second lens 23, so as to calculate positions of the touch points touching the screen 21.

Figure 3:
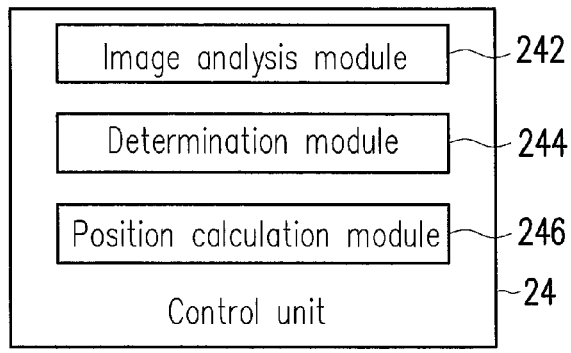
FIG. 3 is a block diagram of a control unit according to an embodiment of the invention.
Figure 4:
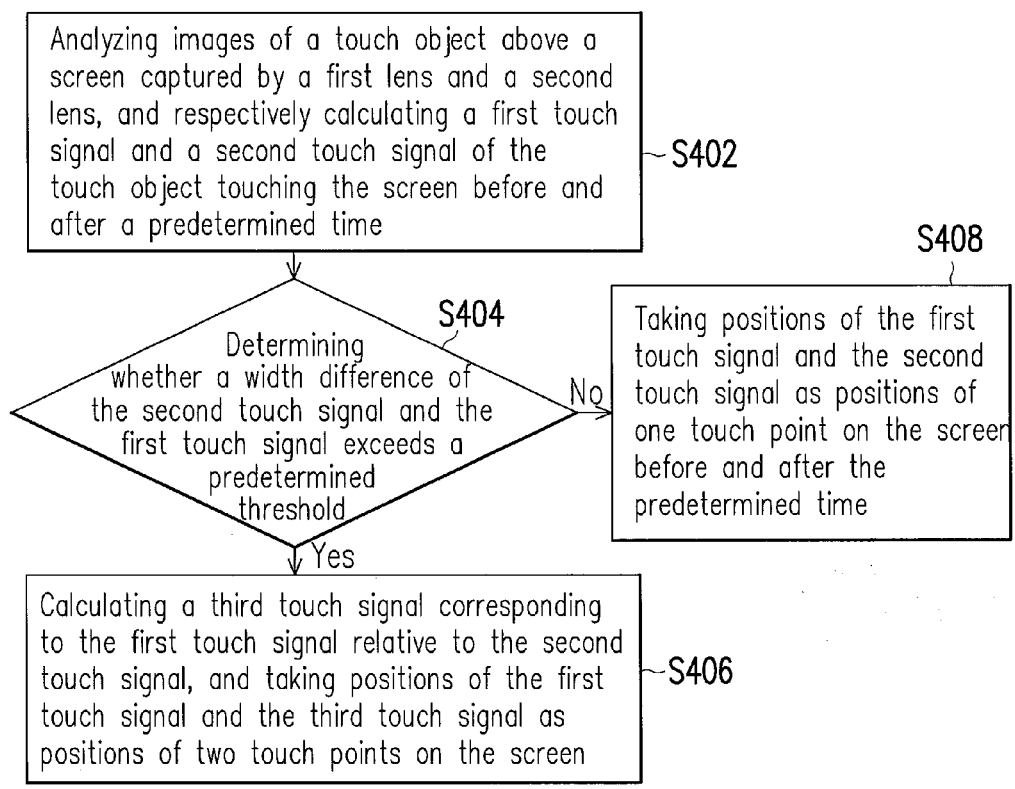
FIG. 4 is a flowchart illustrating a touch point calculation method of an optical touch system according to an embodiment of the invention.

In detail, FIG. 3 is a block diagram of a control unit according to an embodiment of the invention. FIG. 4 is a flowchart illustrating a touch point calculation method of an optical touch system according to an embodiment of the invention. Referring to FIG. 2, FIG. 3 and FIG. 4, the control unit 24 of FIG. 2 is further divided into an image analysis module 242, a determination module 244 and a position calculation module 246 according to functions thereof, and detailed steps of the touch point calculation method are described below with reference of various components in above figures.

First, the image analysis module 242 analyses the images of at least one touch object above the screen 21 that are captured by the first lens 22 and the second lens 23, and respectively calculates a first touch signal and a second touch signal of the touch object touching the screen 21 before and after a predetermined time (step S402). The image analysis module 242, for example, first obtains a first image and a second image above the screen 21 that are respectively captured by the first lens 22 and the second lens 23, and then detects positions and widths of the touch object appeared in the first image and the second image, so as to calculate the first touch signal of the touch object touching the screen 21. After the predetermined time, the image analysis module 242 again obtains a third image and a fourth image above the screen 21 that are respectively captured by the first lens 22 and the second lens 23, and detects positions and widths of the touch object appeared in the third image and the fourth image, so as to calculate the second touch signal of the touch object touching the screen 21.

It should be noticed that the predetermined time can be determined according to a frame rate of the first lens 22 and the second lens 23. For example, when the frame rate is 150 frames per second, it represents that 150 frames can be captured within one second, i.e. one frame is captured every 1/150 second, so that the predetermined time can be set to 1/150 second or a multiple thereof, so as to separate two touch signals in tandem.

Then, the determination module 244 determines whether a width difference of the second touch signal and the first touch signal calculated by the image analysis module 242 exceeds a predetermined threshold (step S404). In detail, when two touch objects that touch the screen 21 are close to each other, the images thereof appeared in the first lens 22 and second lens 23 are partially overlapped, which results in a fact that the width of the second touch signal calculated by the image analysis module 242 is increased. However, besides overlapping of the touch objects causes width increase of the touch signal, movement of the touch object towards the first lens 22 or the second lens 23 may also cause width increase of the touch signal, and such width increase caused by aforesaid movement is probably mistaken as two touch objects by the system. Therefore, in the present embodiment, touch point data of the user operating the optical touch system is analysed to set a suitable threshold to distinguish two operation patterns that two touch objects are overlapped and a single touch object moves towards the lens, so as to avoid misjudgement of the system on a gesture moving towards the lens.

In step S404, when the determination module 244 determines that the width difference exceeds the predetermined threshold, it can be determined that the second touch signal is generated by two overlapped touch objects (for example, two fingers), and the position calculation module 246 calculates a third touch signal corresponding to the first touch signal relative to the second touch signal, and takes positions of the first touch signal and the third touch signal as positions of two touch points on the screen (step S406). The first touch signal represents the touch object that first touches the screen 21, and the second touch signal represents two touch objects that touch the screen 21 and are overlapped in positions. Therefore, the position of the second touch object touching the screen 21 can be deduced according to a relative position of the first touch signal and the second touch signal. In detail, the position calculation module 246 takes a center point of the second touch signal as a center and calculates a mirror position of the position of the first touch signal relative to the center point to serve as the position of the third touch signal.

Figure 5:
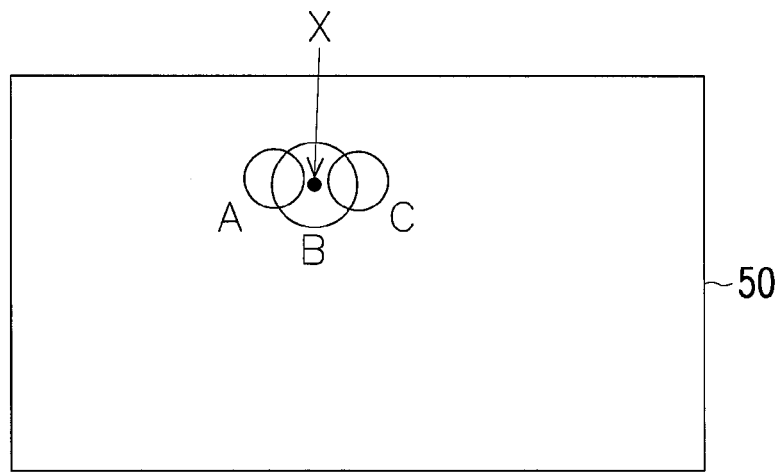
FIG. 5 is a touch point calculation example of an optical touch system according to an embodiment of the invention.

For example, FIG. 5 is a touch point calculation example of the optical touch system according to an embodiment of the invention. Referring to FIG. 5, it is assumed that touch points A and B are respectively positions of touch signals generated when a screen 50 is touched in tandem. Since the touch point A is obtained when the first touch object touches the screen 50, and the touch point B is obtained when the first and the second touch objects touch the screen 50, as long as a center point X of the touch point B is taken as a center to calculate a mirror position of the touch point A relative to the center point, a touch point C of the second touch object touching the screen 50 can be obtained.

On the other hand, in step S404, when the determination module 244 determines that the width difference does not exceed the predetermined threshold, it is determined that the second touch signal is generated when a touch object moves towards the lens, and the position calculation module 246 takes positions of the first touch signal and the second touch signal as positions of one touch point on the screen 21 before and after the predetermined time (step S408). In brief, the positions of the first and the second touch signals can represent a moving track of a single touch object within the predetermined time.

According to the above method, besides that the positions of the touch object touching the screen before and after the predetermined time are recognized, misjudgement of the system on a gesture moving towards the lens is also avoided, by which the recognition rate of multi-touch is improved.

It should be noticed that by observing a gesture that a single touch object moves towards the lens, it is discovered that the more the position of the touch object touching the screen approaches to left and right boundaries of the screen, the closer the distance between the touch object and the optical lens is, and meanwhile the greater the width variation of the touch point resulted from the touch object moving towards the lens is, and the more possible that the single touch object is mistaken as two touch objects by the system. Accordingly, a threshold corresponding table is further established in the system, and different thresholds are used according to different positions of the touch points to distinguish the two operation patterns that multiple touch objects are overlapped and a single touch object moves towards the lens, so as to improve the recognition rate of the multi-touch. Another embodiment is provided below for detailed descriptions.

Figure 6:
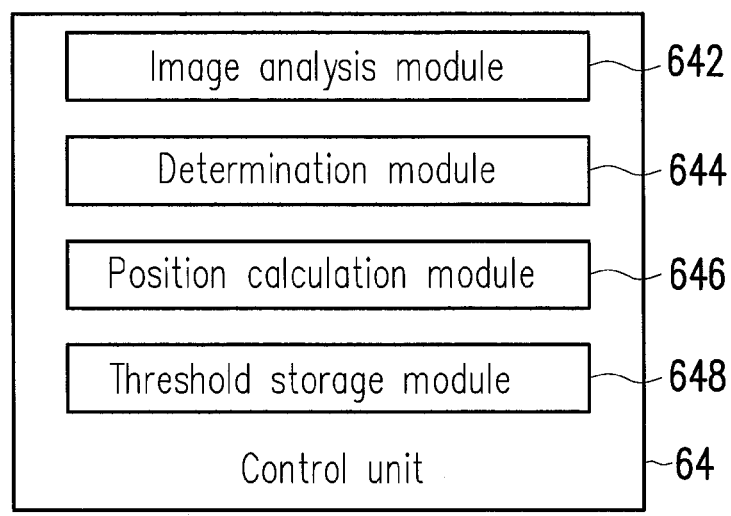
FIG. 6 is a block diagram of a control unit according to an embodiment of the invention.
Figure 7:
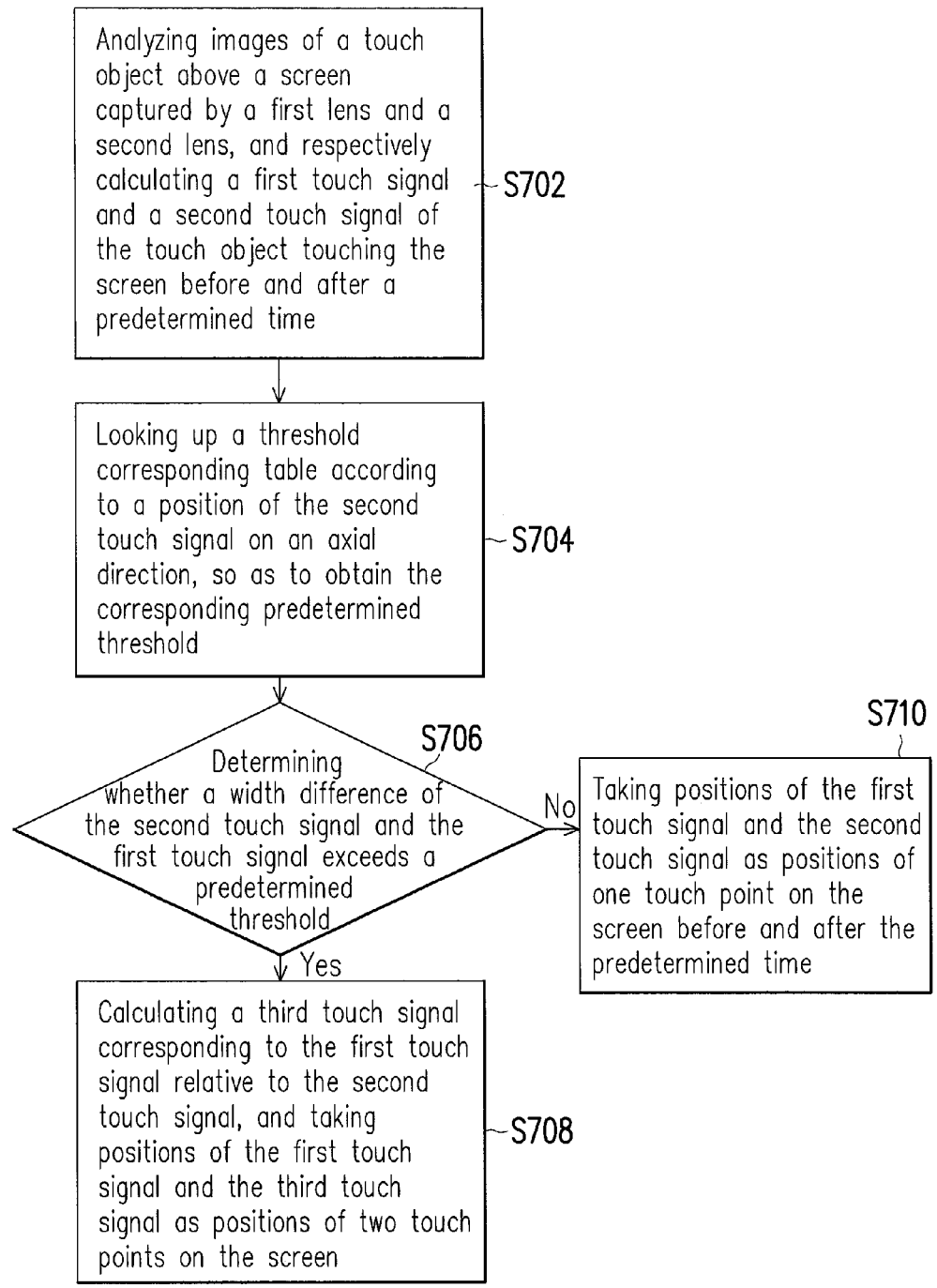
FIG. 7 is a flowchart illustrating a touch point calculation method of an optical touch system according to an embodiment of the invention.

FIG. 6 is a block diagram of a control unit according to an embodiment of the invention. FIG. 7 is a flowchart illustrating a touch point calculation method of an optical touch system according to an embodiment of the invention. Referring to FIG. 6 and FIG. 7, the control unit 64 of the present embodiment is an implementation of the control unit 24 of FIG. 2, and is adapted to the system structure of FIG. 2. The control unit 64 includes an image analysis module 642, a determination module 644, a position calculation module 646 and a threshold storage module 648. Detailed steps of the touch point calculation method are described below with reference to various components in above figures.

First, the image analysis module 642 analyses the images of at least one touch object above the screen 21 that are captured by the first lens 22 and the second lens 23, and respectively calculates a first touch signal and a second touch signal of the touch object touching the screen 21 before and after a predetermined time (step S702).

Then, the determination module 644 looks up a threshold corresponding table stored in the threshold storage module 648 according to a position of the second touch signal on an axial direction, so as to obtain the corresponding predetermined threshold (step S704), and then determines whether a width difference of the second touch signal and the first touch signal calculated by the image analysis module 642 exceeds the predetermined threshold (step S706). In the aforementioned threshold corresponding table, the more the position of the second touch signal approaches to two endpoints on the axial direction (for example, an X-axis direction) of the screen 21, the higher the corresponding predetermined threshold is.

It should be noticed that, different to the aforementioned embodiment, the control unit 64 of the present embodiment further includes a threshold storage module 648, which is used to establish a threshold corresponding table that records a plurality of predetermined thresholds corresponding to a plurality of positions on the axial direction of the screen, and the table can be looked up by the determination module 644 as a basis for comparing with the width difference.

Figure 8:
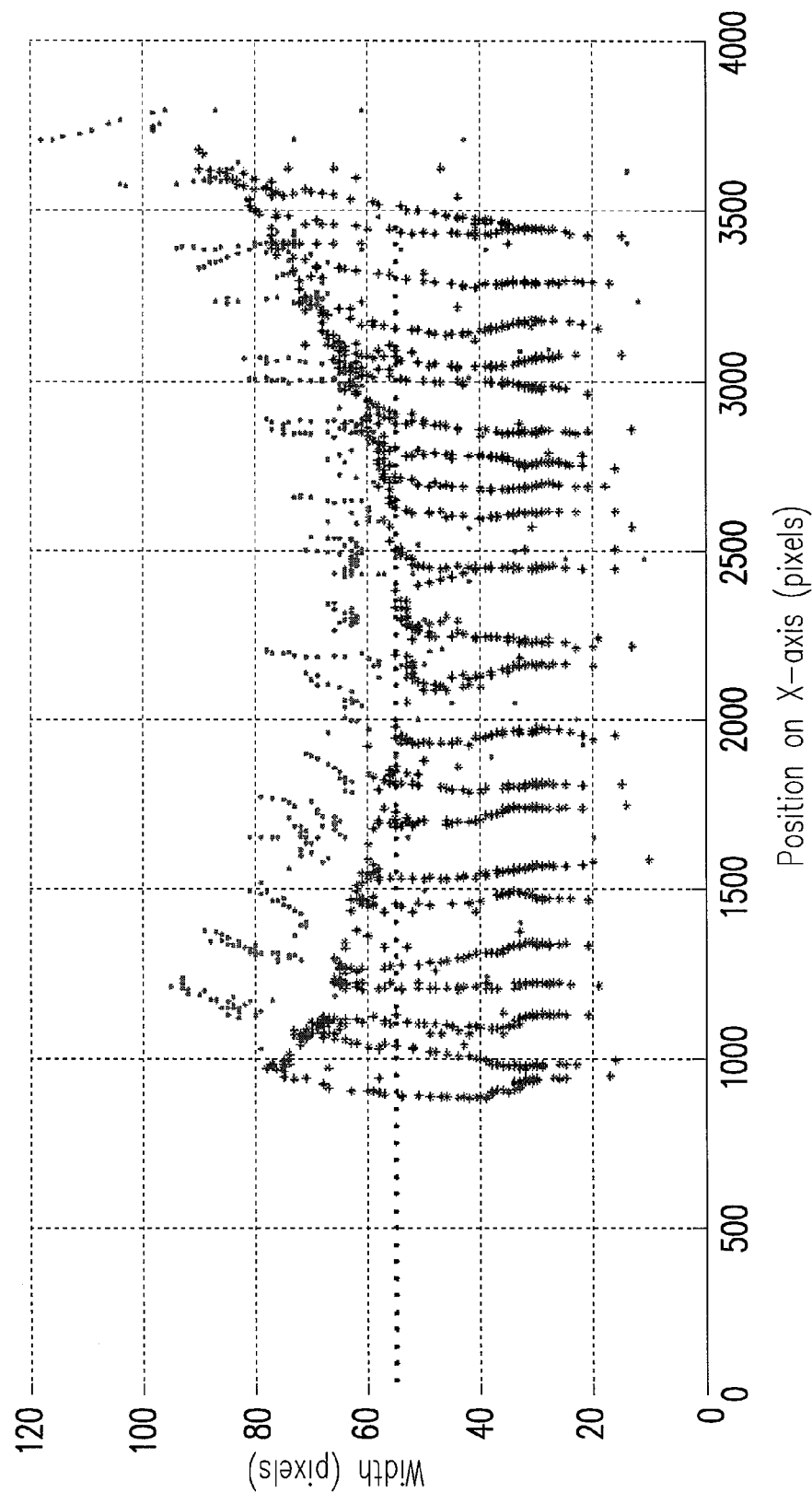
FIG. 8 is a statistic chart of gesture determination according to an embodiment of the invention.

For example, FIG. 8 is a statistic chart of gesture determination according to an embodiment of the invention. Referring to FIG. 8, a horizontal axis represents positions of the detected touch signals on an X-axis direction of the screen, and a vertical axis represents widths of the detected touch signals. Smaller sampling points at an upper part of FIG. 8 represent touch signals generated in response to double-finger touches that are mistaken as single-finger touches, and thick sampling points at a lower part of FIG. 8 represent touch signals generated in response to single-finger touches that are correctly determined as single-finger touches by the system. According to a distribution of these touch signals, it is known that the more the position of the double-finger touch signals approaches to the left and right boundaries of the screen (i.e. the closer to the lens), the more possible the double-finger touch is mistaken as a single-finger touch by the system.

According to the above descriptions, in the threshold corresponding table established by the threshold storage module 648, a higher threshold is set to the touch signals at the left and right sides of the screen, and a lower threshold is set to the touch signals at the center of the screen, so as to distinguish the two operation patterns that multiple touch objects are overlapped and a single touch object moves towards the lens. For example, in the following table 1, a higher threshold 80 is set to the left and right sides of the screen (with X-axis coordinates of 0-1000 and 3500-400), and a lower threshold 55 is set to the certer of the screen (with X-axis coordinates of 2000-2500).

TABLE 1

| X-axis coordinates | Threshold |
|---|---|
| 0-1000 | 80 |
| 1000-1500 | 70 |
| 1500-2000 | 60 |
| 2000-2500 | 55 |
| 2500-3000 | 60 |
| 3000-3500 | 70 |
| 3500-4000 | 80 |

In step S706, when the determination module 644 determines that the width difference exceeds the predetermined threshold, it can be determined that the second touch signal is generated by two overlapped touch objects (for example, two fingers), and the position calculation module 646 calculates a third touch signal corresponding to the first touch signal relative to the second touch signal, and takes positions of the first touch signal and the third touch signal as positions of two touch points on the screen (step S708). Comparatively, when the determination module 644 determines that the width difference does not exceed the predetermined threshold, it is determined that the second touch signal is generated corresponding to one touch object, and the position calculation module 646 takes positions of the first touch signal and the second touch signal as positions of one touch point on the screen before and after the predetermined time (step S710). In brief, the positions of the first and the second touch signals can represent a moving track of a single touch object within the predetermined time.

In summary, in the optical touch system and the touch point calculation method thereof of the present invention, by continuously capturing images of the user's fingers operated above the screen within a very short time, touch objects that touch the screen in tandem are distinguished. Moreover, by setting suitable thresholds according to positions and widths of the detected touch signals, two operation patterns that two touch objects are overlapped and a single touch object moves towards the lens are distinguished, so as to avoid misjudgement of the system on a gesture moving towards the lens.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A touch point calculation method of an optical touch system, adapted to the optical touch system having a first lens, a second lens and a screen, wherein the first lens and the second lens are disposed on a same side of the screen and face to the other side of the screen, the method comprising:
    analyzing images of at least one touch object above the screen that are captured by the first lens and the second lens to respectively calculate a first touch signal and a second touch signal of the at least one touch object touching the screen before and after a predetermined time;
    determining whether a width difference of the second touch signal and the first touch signal exceeds a predetermined threshold; and
    when the width difference exceeds the predetermined threshold, calculating a third touch signal corresponding to the first touch signal relative to the second touch signal, and taking positions of the first touch signal and the third touch signal as positions of two touch points on the screen.

2. The touch point calculation method of the optical touch system as claimed in claim 1, wherein the step of determining whether the width difference of the second touch signal and the first touch signal exceeds the predetermined threshold further comprises:
    when the width difference does not exceed the predetermined threshold, taking positions of the first touch signal and the second touch signal as positions of one touch point on the screen before and after the predetermined time.

3. The touch point calculation method of the optical touch system as claimed in claim 1, wherein the step of analyzing the images of the at least one touch object above the screen that are captured by the first lens and the second lens to respectively calculate the first touch signal and the second touch signal of the at least one touch object touching the screen before and after the predetermined time comprises:
    obtaining a first image and a second image above the screen that are respectively captured by the first lens and the second lens;
    detecting positions and widths of the at least one touch object appeared in the first image and the second image, so as to calculate the first touch signal of the at least one touch object touching the screen;
    after the predetermined time, obtaining a third image and a fourth image above the screen that are respectively captured by the first lens and the second lens; and
    detecting positions and widths of the at least one touch object appeared in the third image and the fourth image, so as to calculate the second touch signal of the at least one touch object touching the screen.

4. The touch point calculation method of the optical touch system as claimed in claim 1, wherein before the step of determining whether the width difference of the second touch signal and the first touch signal exceeds the predetermined threshold, the method further comprises:
    establishing a threshold corresponding table, in which a plurality of predetermined thresholds corresponding to a plurality of positions on an axial direction of the screen are recorded.

5. The touch point calculation method of the optical touch system as claimed in claim 4, wherein the step of determining whether the width difference of the second touch signal and the first touch signal exceeds the predetermined threshold comprises:
    looking up the threshold corresponding table according to a position of the second touch signal on the axial direction to obtain the corresponding predetermined threshold to serve as a basis for comparing with the width difference.

6. The touch point calculation method of the optical touch system as claimed in claim 4, wherein in the threshold corresponding table, the more the position approaches to two endpoints on the axial direction of the screen, the higher the corresponding predetermined threshold is.

7. The touch point calculation method of the optical touch system as claimed in claim 1, wherein the step of calculating the third touch signal corresponding to the first touch signal relative to the second touch signal comprises:
    taking a center point of the second touch signal as a center, and calculating a mirror position of the position of the first touch signal relative to the center point to serve as the position of the third touch signal.

8. The touch point calculation method of the optical touch system as claimed in claim 7, wherein the step of calculating the position of the first touch signal comprises:
    calculating angles of a center point of the first touch signal relative to the first lens and the second lens; and
    obtaining the position of the first touch signal through triangulation location according to the angles and a distance between the first lens and the second lens.

9. An optical touch system, comprising:
    a screen;
    a first lens and a second lens, disposed on a same side of the screen and face to the other side of the screen, and configured to capture images of at least one touch object above the screen; and
    a control unit, coupled to the first lens and the second lens, comprising:
        an image analysis module, configured to analyze the images captured by the first lens and the second lens, and respectively calculate a first touch signal and a second touch signal of the at least one touch object touching the screen before and after a predetermined time;
        a determination module, configured to detail line whether a width difference of the second touch signal and the first touch signal exceeds a predetermined threshold; and
        a position calculation module, configured to calculate a third touch signal corresponding to the first touch signal relative to the second touch signal when the determination module determines that the width difference exceeds the predetermined threshold, and take positions of the first touch signal and the third touch signal as positions of two touch points on the screen.

10. The optical touch system as claimed in claim 9, wherein when the determination module determines that the width difference does not exceed the predetermined threshold, the position calculation module takes positions of the first touch signal and the second touch signal as positions of one touch point on the screen before and after the predetermined time.

11. The optical touch system as claimed in claim 9, wherein the image analysis module detects positions and widths of the at least one touch object appeared in a first image and a second image captured by the first lens and the second lens, so as to calculate the first touch signal of the at least one touch object touching the screen.

12. The optical touch system as claimed in claim 11, wherein the image analysis module further detects and positions and widths of the at least one touch object appeared in a third image and a fourth image captured by the first lens and the second lens after the predetermined time, so as to calculate the second touch signal of the at least one touch object touching the screen.

13. The optical touch system as claimed in claim 9, further comprising:
a threshold storage module, configured to store a threshold corresponding table recording predetermined thresholds corresponding to a plurality positions on an axial direction of the screen.

14. The optical touch system as claimed in claim 13, wherein the determination module looks up the threshold corresponding table according to a position of the second touch signal on the axial direction to obtain the corresponding predetermined threshold to serve as a basis for comparing with the width difference.

15. The optical touch system as claimed in claim 13, wherein in the threshold corresponding table, the more the position approaches to two endpoints on the axial direction of the screen, the higher the corresponding predetermined threshold is.

16. The optical touch system as claimed in claim 9, wherein the position calculation module takes a center point of the second touch signal as a center, and calculates a minor position of the position of the first touch signal relative to the center point to serve as the position of the third touch signal.

17. The optical touch system as claimed in claim 9, wherein the position calculation module calculates angles of a center point of the first touch signal relative to the first lens and the second lens, and obtains the position of the first touch signal through triangulation location according to the angles and a distance between the first lens and the second lens.

* * * * *